Patented Oct. 12, 1937

2,095,334

UNITED STATES PATENT OFFICE 2,095,334

MANUFACTURE OF CELLULOSE ESTERS

John Edward Jones, Spondon, near Derby, England, assignor to Celanese Corporation of America, a corporation of Delaware No Drawing. Application January 3, 1936, Serial No. 57,398. In Great Britain January 16, 1935

5 Claims. (Cl. 260—102)

This invention relates to the manufacture and treatment of organic esters of cellulose, and particularly to the manufacture of organic esters of cellulose of a high degree of stability.

The esterification of cellulose is usually carried out in the presence of catalysts, of which the most common is sulphuric acid. The esters produced by such processes are, however, in general, contaminated with the catalyst, such catalyst being present in admixture and/or combination with the cellulose ester. The removal of such catalyst is highly desirable for the production of cellulose esters of good stability, and it is therefore customary to subject the cellulose ester to a process generally referred to as stabilization, in which the cellulosic esters are treated with an agent such as hot water or hot dilute acid, in order to remove the catalyst from admixture and/or combination therewith. Such stabilizing processes are usually carried out with more or less vigorous agitation of the mixture of cellulose ester and hot aqueous medium.

According to the present invention the stabilization of cellulose esters is effected while maintaining the cellulose ester in a substantially stationary state, the stabilizing liquor being passed continuously through the mass of cellulose ester. The process presents substantial advantages over prior processes in that the material is not excessively reduced in particle size during the treatment and thus does not contain a high percentage of "fines", i. e. extremely small particles of cellulose ester which are of little commercial value.

The invention is of particular value in the stabilization of cellulose acetate but may also be applied to the stabilization of other esters of cellulose, for example cellulose formate, cellulose propionate, and cellulose butyrate. Although the process of the invention is of special value in the stabilization of esters which have been produced with the aid of sulphuric acid as catalyst, it is also of value in the stabilization of esters which have been produced in the presence of other catalysts, such as di- and polybasic acids and their derivatives, e. g. phosphoric acid, sulphuryl chloride and sodium bisulphate. Cellulose esters produced with the aid, as catalysts, of metal halides or metal halides mixed with hydrohalide acids, e. g. zinc chloride or ferric chloride alone or mixed with hydrochloric acid, or produced with the aid, as catalysts, of perchloric acid and/or perchlorates e. g. zinc and magnesium perchlorates, may also be treated by the process of this invention.

The cellulose ester may be subjected to the stabilizing treatment in any suitable form, but it is preferably treated in the form in which it is precipitated from esterification or ripening solutions. The precipitated cellulose ester may be washed prior to the stabilizing treatment and/or may be treated with a substance of weakly alkaline reaction with a view to removing any substantial excess of acid present. Thus where an acid catalyst such as sulphuric acid has been employed in the esterifying process the excess of such acid may be neutralized by the addition of salts such as the acetates, carbonates or bicarbonates of sodium, potassium or ammonium. Complete neutralization of the sulphuric acid is, however, unnecessary, and, in fact, the retention of a small amount of free sulphuric acid in the material may facilitate the stabilization.

Any suitable stabilizing liquor may be employed in the process of the present invention, e. g. hot water, but preferably acid stabilizing liquors are employed as, for example, hot dilute solutions of acids. Preferably a dilute sulphuric acid solution in which the sulphuric acid concentration is of the order of 0.01 to 0.03% is employed, and such as a solution forms a very satisfactory medium for the stabilization of cellulose acetate produced with the aid of sulphuric acid as catalyst.

The stabilizing process may be effected in any suitable apparatus which is adapted to hold the cellulose ester in a substantially stationary condition and to permit the passage of the stabilizing medium through the cellulose ester. One form of apparatus suitable for carrying out the process consists essentially of a vessel provided with a false bottom near to the true bottom. The false bottom consists of a perforated plate and the cellulose ester to be stabilized is supported on this plate. Stabilizing liquor may be introduced into and withdrawn from the vessel in any suitable way, e. g. introduced by an inlet situated at the top of the vessel near to one side, and withdrawn from an outlet situated at the bottom of the vessel near to the other side, or the stabilizing liquor may be introduced into the top of the vessel through a distributing device so as to be uniformly applied to the surface of the cellulose ester, and withdrawn through an outlet at the bottom of the vessel. The inlet and outlet pipes for the stabilizing liquid are connected together and include in their circuit a steam injector, pump or other device adapted to maintain circulation of the stabilizing liquid through the vessel. The bottom of the vessel may be provided with jets for the introduction of steam into the vessel to keep the liquid contents of the vessel boiling.

It will be appreciated that this apparatus is susceptible of much variation and modification. Thus there may be more than one perforated plate carrying the cellulose ester, or the cellulose ester may be contained between two perforated plates so adjusted in relation to one another as to prevent any substantial movement of the cellulose ester which might arise from the boiling action of the liquid. Again, means may be provided to collect any cellulose ester which passes through the perforations in the plate or plates, and the outlet for the stabilizing liquid may be provided with a fine mesh gauze filter to prevent particles of cellulose ester from being carried to the circulating pump, if such is used. Preferably the stabilization of the cellulose ester is effected at substantially atmospheric pressure though, if desired, the stabilization may be effected at superatmospheric pressures.

The stabilizing liquid is passed through the vessel until a test sample of the cellulose ester shows that its content of catalyst has been reduced to the desired degree. When stabilization is completed the cellulose ester may, if desired, be removed from the stabilizing vessel and subsequently washed and dried, or, as an alternative, these latter operations may be effected in the stabilizing vessel itself. Thus the stabilizing liquid may be run off from the vessel and hot or cold water passed through the vessel to wash the cellulose ester. After such washing operation the wash liquor may be drained off from the stabilizing vessel and then a warm gas such as dry steam or dry steam mixed with hot air may be forced through the vessel so as to dry the cellulose ester contained therein. It will thus be appreciated that by the process of the present invention the three steps of stabilizing, washing and drying may be carried out without any movement of the cellulose ester from one place to another.

The following example illustrates the invention, but is not to be taken as limiting it in any way.

Example

Cellulose acetate is prepared with the aid of sulphuric acid as catalyst, ripened until it attains the desired solubility characteristics, and precipitated from the ripening solution. The precipitated cellulose acetate is then placed on a perforated false bottom in a suitable vessel and hot water is circulated through the vessel, thus washing the quiescent cellulose acetate. A 0.2% aqueous solution of sulphuric acid is then circulated through the vessel, the liquid in the vessel being kept boiling by introducing steam into the vessel through jets situated in the true bottom of the vessel. The circulation of the aqueous sulphuric acid is continued until the stabilization of the cellulose acetate has proceeded to the desired degree. The aqueous sulphuric acid is then drained from the vessel and the cellulose acetate washed by circulating water through the vessel. The cellulose acetate is then dried by draining off the liquid and passing hot air through the vessel.

By the process of this invention the stabilization of cellulose esters may be effected substantially without loss of material, e. g. in the form of "fines", and the cellulose esters produced passes valuable properties in having a high heat test and in yielding artificial products of high clarity and uniformity. The esters are particularly valuable in the production of artificial filaments, threads, yarns, films, foils and the like by wet or dry spinning processes.

Having described my invention, what I desire to secure by Letters Patent is:—

1. Process for the stabilization of solid cellulose acetate which has been prepared in the presence of sulphuric acid as catalyst, which comprises stabilizing such cellulose acetate by passing a hot 0.01 to 0.03% aqueous solution of sulphuric acid continuously through the solid cellulose acetate while maintaining the cellulose acetate in a substantially stationary state.

2. Process for the stabilization of solid cellulose acetate produced in solution by esterifying cellulose with acetic anhydride in the presence of sulphuric acid as catalyst and precipitated from solution, which comprises stabilizing the solid, precipitated cellulose acetate by passing a hot 0.01 to 0.03% aqueous solution of sulphuric acid continuously through such cellulose acetate while maintaining such cellulose acetate in a substantially stationary state.

3. Process for the stabilization of solid cellulose acetate, which comprises stabilizing cellulose acetate by passing a hot 0.01 to 0.03% aqueous solution of sulphuric acid continuously through the solid cellulose acetate while maintaining the cellulose acetate in a substantially stationary state.

4. Process for the stabilization of solid cellulose acetate, which comprises stabilizing cellulose acetate by passing a hot 0.01 to 0.03% aqueous solution of sulphuric acid continuously through the solid cellulose acetate while maintaining the cellulose acetate in a substantially stationary state and under substantially atmospheric pressure.

5. Process for the stabilization of solid cellulose acetate, which comprises stabilizing cellulose acetate by passing a hot 0.01 to 0.03% aqueous solution of sulphuric acid continuously through the solid cellulose acetate while maintaining the cellulose acetate in a substantially stationary state and thereafter washing and drying the cellulose acetate while still maintaining it in a substantially stationary state.

JOHN EDWARD JONES.